Aug. 13, 1929.   L. STEIN   1,724,859
AIRPLANE
Filed July 11, 1927
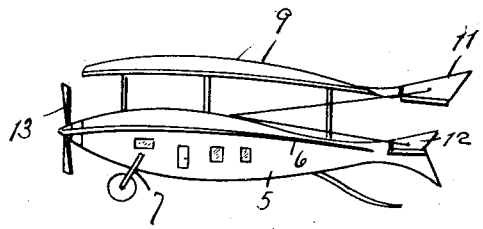
Fig. I.
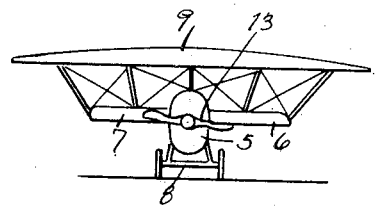
Fig. II.
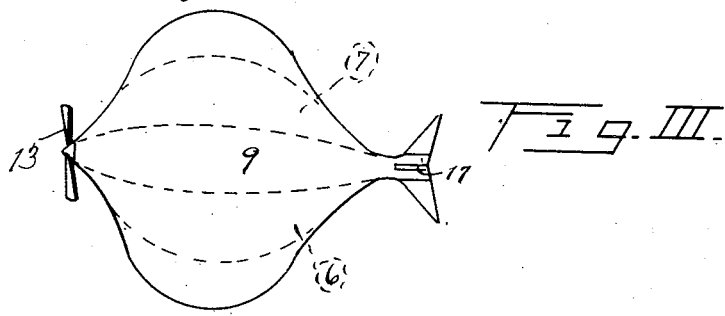
Fig. III.
Fig. IV.
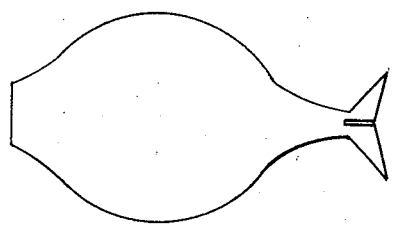
Fig. V.
INVENTOR.
LEON STEIN
BY *Victor J. Evans*
ATTORNEY.

Patented Aug. 13, 1929.

1,724,859

UNITED STATES PATENT OFFICE.

LEON STEIN, OF SAN FRANCISCO, CALIFORNIA.

AIRPLANE.

Application filed July 11, 1927. Serial No. 204,863.

This invention relates to improvements in airplanes.

The principal object of this invention is to produce an airplane having an increased lifting area.

Another object is to produce an airplane having a greater speed.

A further object is to produce an airplane which will have an inherent stability.

A still further object is to produce an airplane which will more closely resemble a bird structure and therefore will be easier to operate.

Other objects and advantages will be apparent during the course of the following description.

In the accompanying drawings forming a part of this specification and in which like numerals are employed to designate like parts throughout the same, Figure 1 is a side elevation of my improved airplane, Figure 2 is a front elevation of Figure 1, Figure 3 is a top plan view of Figure 1 showing the preferred form of wing structure, Figure 4 is a modified form of a wing structure, and Figure 5 is a further modified form.

At the present time airplanes are generally constructed so as to present a horizontally disposing wing of considerable length when viewed from the front.

It is my object to produce an airplane wherein the same will have a greater lifting area than is common in most planes, and at the same time an airplane which will not present as great a resistance to forward movement. In other words I propose to so design my supporting surfaces so that the advancing edge will be of less length than the depth of the wing.

In accomplishing this object I employ a fuselage 5 which may be of any desired shape and construction. To the sides of the fuselage I secure wings 6 and 7. These wings are relatively short in comparison to the ordinary airplane wing structure but are long from front to back thereby securing the same lifting force as would be secured by wings of the standard construction. With this type of wing it would be apparent that very little head resistance is encountered.

The usual landing gear is shown at 8 and forms no part of my invention. Superimposed above the fuselage is a upperwing structure 9. This wing structure is so constructed that it extends from the front end of the fuselage to the rear end thereof and terminates in a tail section 11. This tail section corresponds to the tail section 12 carried on the fuselage. The airplane may be propelled in any convenient manner consistent with good practise, and as a matter of illustration I have shown a propeller at 13. The tail sections 11 and 12 are adapted to be operated in unison. The result of this construction is that an airplane so built should have greater speed due to its lessened wind resistance, greater stability due to its peculiar shaped wing surfaces and greater ease of handling due to its double tail therein.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In an airplane of the character described, a fuselage, wing surfaces secured to the opposite sides thereof, the width of said wing surfaces being less than the length of said wing surfaces, the length of said wing surfaces extending from the front to the rear of said fuselage, a superimposed wing surface secured to said fuselage and having greater area than the first mentioned wing surfaces and tail sections secured to said superimposed wing surface, and a tail section secured to said fuselage, said tail sections being adapted to operate in unison.

In testimony whereof I affix my signature.

LEON STEIN.